W. W. NEIGHBOUR.
BALL RETAINER.
APPLICATION FILED NOV. 18, 1916.

1,222,447.

Patented Apr. 10, 1917.

WITNESSES
Thos. F. Knox
T. L. Mochan

INVENTOR
W. W. Neighbour
Victor J. Evans
ATTORNEY

UNITED STATES PATENT OFFICE.

WILLIAM W. NEIGHBOUR, OF SPARTANBURG, SOUTH CAROLINA.

BALL-RETAINER.

1,222,447.

Specification of Letters Patent.    Patented Apr. 10, 1917.

Application filed November 18, 1916.   Serial No. 132,148.

*To all whom it may concern:*

Be it known that I, WILLIAM W. NEIGHBOUR, a citizen of the United States, residing at Spartanburg, in the county of Spartanburg and State of South Carolina, have invented new and useful Improvements in Ball-Retainers, of which the following is a specification.

This invention relates to retaining means for use in connection with ball bearings.

The object of the invention is the provision of a ring of the above class for use in connection with annular, radial, thrust or other bearings, by means of which balls may be retained in position in a manner to overcome wear usually incident to the contact of the balls with rough or sharp edges.

Another object of the invention is to provide a ring in which the balls are loosely though securely held to provide free movement and to present the greatest possible bearing surface for contact with the bearing.

With the above and other objects in view the invention consists of the novel construction herein set forth and illustrated in the accompanying drawings, in which.

In the drawings like characters of reference denote corresponding parts.

Figure 1:
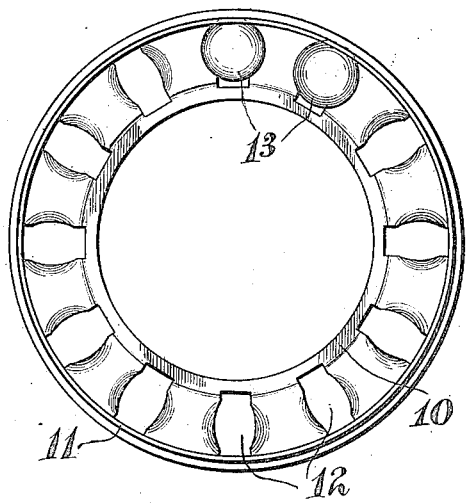
Figure 1 is a plan view of the retaining ring constructed in accordance with the invention and illustrating the number of balls in the ball receiving opening.
Figure 2:
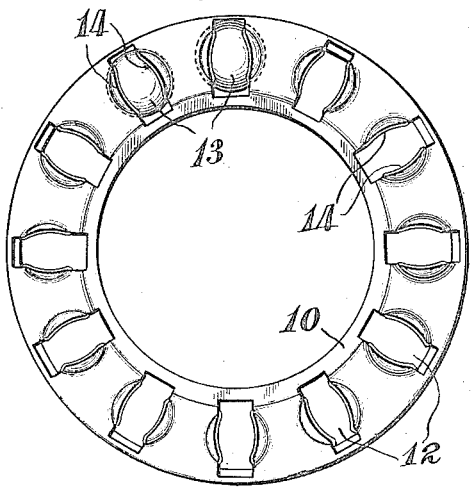
Fig. 2 is a reverse plan view thereof.
Figure 3:
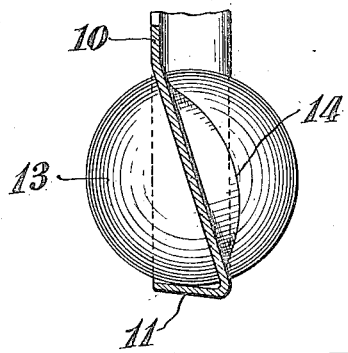
Fig. 3 is an enlarged cross sectional view of the ring taken on a point to show one of the ball receiving openings.
Figure 4:
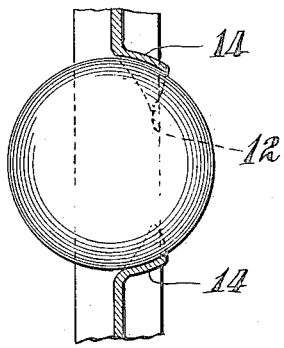
Fig. 4 is a sectional view taken at right angles.

In the practical form of the invention the ring is stamped or formed from a single piece of material and comprises a body portion 10 which is dished in the manner shown, and is formed with an outer flange 11, the said flange being bent at an acute angle to the said body portion. Formed upon the body portion are a plurality of spaced elongated openings 12 adapted to receive the balls 13. The openings 12 are of a less width than the diameter of the balls and are provided with outwardly extending substantially arcuate shaped flanges 14 to provide ball seats. These seats, as will be seen from the drawings, are also of a less width than the diameter of the balls and the flanges project outwardly upon the side of the body portion opposite that of the flange 11. Balls are positioned within the openings by forcing or springing them into the seats and behind the flange 11, so that the said flange and seats coöperate to retain the balls within the openings. The angle of the flange with respect to the ring is such that the surface of the ball will bear upon the flange portion of the said flange and not against the edge. As will be seen by the drawings the balls are securely retained within the opening by means of the seats and coöperating flange and out of contact with the openings.

Figure 5:
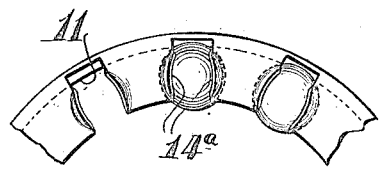
Fig. 5 is a plan view of a portion of a ring showing the modified form of opening.

In Fig. 5 of the drawings there is shown a slight modification of the opening. In this form the openings are substantially circular in formation and are open at their inner portions, that is at the inner diameter of the body member. The flanges 14ª of these openings are formed by forcing outwardly the opposite sides of the opening, the diameter of the opening being such that the coöperation of the flange 11 will prevent the contact of the ball with the outer edges of these openings.

From the foregoing description when taken in connection with the accompanying drawings it is thought that the construction and use of the invention will be apparent, and that further description will be unnecessary.

Having described the invention, what I claim is;

1. A ball retainer comprising a ring, an annular flange formed on said ring around its outer periphery, said flange being arranged at an acute angle to said ring, said ring being provided with openings, flanged ball seats formed in said openings, the flanges of the seats projecting upon the side of the ring opposite that of the annular flange.

2. A ball retainer comprising a ring, an annular flange carried by said ring and arranged at an acute angle thereto, said ring being formed with ball receiving openings, and means whereby balls are retained within the openings out of contact with the edges thereof.

3. A ball retainer comprising a ring formed with an inclined annular surface having ball receiving openings therein and an annular flange carried by said ring and arranged at an acute angle thereto.

4. A ball retainer comprising a ring having ball receiving openings therein, an annular ball retaining flange carried by said ring and arranged at an acute angle thereto, said ring being provided with ball receiving openings, and means formed upon the edges of said openings and coöperating with said flange for retaining balls within the openings out of contact with the edges of said openings.

In testimony whereof I affix my signature.

WILLIAM W. NEIGHBOUR.

Copies of this patent may be obtained for five cents each, by addressing the "Commissioner of Patents, Washington, D. C."